(12) United States Patent
Fujinami

(10) Patent No.: US 10,368,229 B2
(45) Date of Patent: Jul. 30, 2019

(54) COMMUNICATION APPARATUS AND COMMUNICATION CONTROL METHOD IN A COMMUNICATION SYSTEM

(71) Applicant: NEC Corporation, Tokyo (JP)

(72) Inventor: Makoto Fujinami, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/023,148

(22) PCT Filed: Sep. 19, 2014

(86) PCT No.: PCT/JP2014/004825
§ 371 (c)(1),
(2) Date: Mar. 18, 2016

(87) PCT Pub. No.: WO2015/040866
PCT Pub. Date: Mar. 26, 2015

(65) Prior Publication Data
US 2016/0234673 A1 Aug. 11, 2016

(30) Foreign Application Priority Data
Sep. 19, 2013 (JP) ................. 2013-193683

(51) Int. Cl.
*H04W 8/02* (2009.01)
*H04W 36/00* (2009.01)
(Continued)

(52) U.S. Cl.
CPC ............ *H04W 8/02* (2013.01); *H04L 67/142* (2013.01); *H04W 36/0033* (2013.01);
(Continued)

(58) Field of Classification Search
CPC ... H04W 8/02; H04W 36/0033; H04W 36/12; H04L 67/142; H04L 61/2539
See application file for complete search history.

(56) References Cited

U.S. PATENT DOCUMENTS 9,141,625 B1 * 9/2015 Thornewell ....... G06F 17/30079
2014/0165063 A1 * 6/2014 Shiva ................. G06F 9/45533
718/1

FOREIGN PATENT DOCUMENTS

| JP | 2012-182690 A | 9/2012 |
| JP | 2013-168806 A | 8/2013 |
| JP | 2013-197645 A | 9/2013 |

OTHER PUBLICATIONS

Kotaro Yamada, Takashi Kobayashi, "Proposal and Implementation of remote support live migration" IEICE Technical Report, Network System, vol. 111, No. 468, Mar. 1, 2012 (Mar. 1, 2012), pp. 129 to 132, NS2011-202.

(Continued)

*Primary Examiner* — Thai Nguyen
(74) *Attorney, Agent, or Firm* — Wilmer Cutler Pickering Hale and Dorr LLP

(57) ABSTRACT

A communication apparatus and a communication control method are provided that make it possible to easily relocate communication apparatus while the continuity of a service a mobile terminal is using is maintained. In a communication system including a terminal (400), communication apparatuses (A, B) that provide a service to the terminal (400) each include: a virtual machine (10) that manages a state of communication with the terminal (400) by using information on a session for providing the service; and a virtual machine management section (11) that controls execution of the virtual machine and migration of the virtual machine.

19 Claims, 14 Drawing Sheets

(51) Int. Cl.
    *H04L 29/08*     (2006.01)
    *H04W 88/00*     (2009.01)
    *H04W 36/12*     (2009.01)
    *H04L 29/12*     (2006.01)

(52) U.S. Cl.
    CPC ....... *H04W 88/005* (2013.01); *H04L 61/2539* (2013.01); *H04W 36/12* (2013.01)

(56) References Cited

OTHER PUBLICATIONS

Keisuke Kamada et al., "Design and Evaluation of Global Live Migration with Mobility Support for IP Multicast", Information Processing Society of Japan Internet and Operation Technology Symposium 2011, Dec. 1, 2011 (Dec. 1, 2011), pp. 23 to 30.

Takeshi Usui et al., "A Design of Service Mobility Architecture with Session State Migration", IEICE Technical Report, Mobile Multimedia Communications, vol. 111, No. 75, May 26, 2011 (May 26, 2011), pp. 81 to 86, MoMuC2011-8.

International Search Report corresponding to PCT/JP2014/004825 dated Dec. 16, 2014 (5 pages).

Japanese Office Action issued by the Japan Patent Office for Japanese Application No. 2015-537563 dated Jun. 26, 2018 (7 pages).

Kamada, K., et al., "Design and Evaluation of Global Live Migration with Mobility Support for IP Multicast," Information Processing Society of Japan, vol. 54, No. 3, pp. 1061-1070 (Mar. 2013).

\* cited by examiner ns (mobility protocols) in 3GPP, whereas MIPv4, MIPv6, PMIPv4, and PMIPv6 are adopted in WiMAX. Any of the mobile communication systems and any of the mobility protocols have commonality in their basic operation of transferring traffic addressed to a mobile terminal to a point of connection to this mobile terminal.
COMMUNICATION APPARATUS AND COMMUNICATION CONTROL METHOD IN A COMMUNICATION SYSTEM

CROSS-REFERENCE TO RELATED APPLICATIONS

This application is a national stage application of International Application No. PCT/JP2014/004825 entitled "Communication Apparatus and Communication Control Method in a Communication System" filed on Sep. 19, 2014, which claims priority to Japanese Application No. 2013-193683 filed on Sep. 19, 2013, the disclosures of which are hereby incorporated by reference in their entirety.

TECHNICAL FIELD

The present invention relates to a communication system including a terminal and, more particularly, to a communication apparatus and a communication control method for continuing a communication of a terminal.

BACKGROUND ART

3GPP (The 3rd Generation Partnership Project), 3GPP2 (The 3rd Generation Partnership Project 2), and WiMAX (Worldwide Interoperability for Microwave Access) are known as examples of a mobile communication system in which a mobility anchor provides mobility to a terminal. The mobility is implemented by a protocol such as GTP (GPRS (General Packet Radio Service) Tunneling Protocol), MIPv6 (Mobility IPv6), PMIPv6 (Proxy MIPv6), MIPv4 (Mobility IPv4), PMIPv4 (Proxy MIPv4), or the like. GTP, MIPv6, and PMIPv6 are adopted as protocols for implementing mobility In such mobile communication systems, a system is proposed in which a proxy delivery server is disposed between a core network and an external network in order to suppress a delay of traffic and to maintain the continuity of a service a mobile terminal is using even if mobility anchor relocation takes place (see PTL 1). This system will be described briefly with reference to FIG. 1.

Referring to FIG. 1, a case will be considered where a plurality of proxy delivery servers 600a and 600b are disposed between an external network and a core network, and where gateway (GW) relocation from an access network GW 200a to another access network GW 200b and anchor relocation from a mobility anchor 100a to another mobility anchor 100b take place due to a move of a terminal 400. When a relocation request is made from the mobility anchor 100b, the proxy delivery server 600b makes a context request to the proxy delivery server 600a, which is relaying the delivery of a content to the terminal 400, and acquires context information related to the relaying of the content.

The context information includes, for example, content location information, session information, and the like. The content location information indicates a location in the content to be delivered up to which the content has been delivered to the mobile terminal 400, and is expressed by elapsed time, the number of bytes, the number of key frames in a compressed image stream, or the like from the head of the content. The session information is information required to allow a session with the mobile terminal 400 to continue. In case of the HTTP/TCP protocol, the session information includes, for example, HTTP header information that the transmission to the mobile terminal 400 is not completed, a source address, a destination address, TCP source and destination port numbers, a sequential number, an acknowledgement number, flag information to be set in the flag field of the TCP header, a window size, and transmission buffer information.

When receiving such context information, the proxy delivery server 600b uses this context information to reproduce the state of the session for delivery of the content between the proxy delivery server 600a and the terminal 400, and uses the reproduced session to forward the subsequent part of the content from a service providing server 500 to the terminal 400.

The provision of proxy delivery servers as described above makes it possible to reduce the delay time of traffic and to achieve efficient use of network resources even if there is a long distance in terms of topology between the mobility anchor 100a and the access network GW 200b.

CITATION LIST

Patent Literature

[PTL 1]
Japanese Patent Application Unexamined Publication No. 2012-182690

SUMMARY OF INVENTION

Technical Problem

However, to transfer context information between proxy delivery servers, a source proxy delivery server needs to extract the above-described content location information, session information, and the like and generate context information. Information such as session information to be extracted from the OS (Operating System) of a proxy delivery server, in particular, cannot be easily acquired because, in general, an interface enabling such extraction from the OS is not defined. More generally, it is not easy to relocate the communication apparatus (e.g., the proxy delivery server disclosed in PTL 1) that manages the state of communication with a terminal while maintaining a state in communication.

Accordingly, an object of the present invention is to provide a communication apparatus and a communication control method that make it possible to easily relocate communication apparatus while the continuity of a service a mobile terminal is using is maintained.

Solution to Problem

A communication apparatus according to the present invention is a communication apparatus that provides a service to a terminal in a communication system including the terminal, characterized by comprising: a virtual machine that manages a state of communication with the terminal by using information on a session for providing the service; and a virtual machine control means for controlling execution of the virtual machine and migration of the virtual machine.

A communication control method for a communication apparatus according to the present invention is a communication control method for a communication apparatus that provides a service to a terminal in a mobile communication system including the terminal, characterized by comprising: by a virtual machine control means, controlling execution of a virtual machine and migration of the virtual machine; and by the virtual machine, managing a state of communication with the terminal by using information on a session for providing the service.

A communication system according to the present invention is a communication system including a terminal, comprising a plurality of communication apparatuses that provide a service to the terminal, characterized in that each communication apparatus includes: a virtual machine means for managing a state of communication with the terminal by using information on a session for providing the service; and a virtual machine control means for controlling execution of the virtual machine and migration of the virtual machine.

Advantageous Effects of Invention

According to the present invention, virtual machine migration makes it possible to easily relocate communication apparatus while the continuity of a server a mobile terminal is using is maintained.

DESCRIPTION OF EMBODIMENTS

<Outline of an Exemplary Embodiment of the Present Invention>

Figure 1:
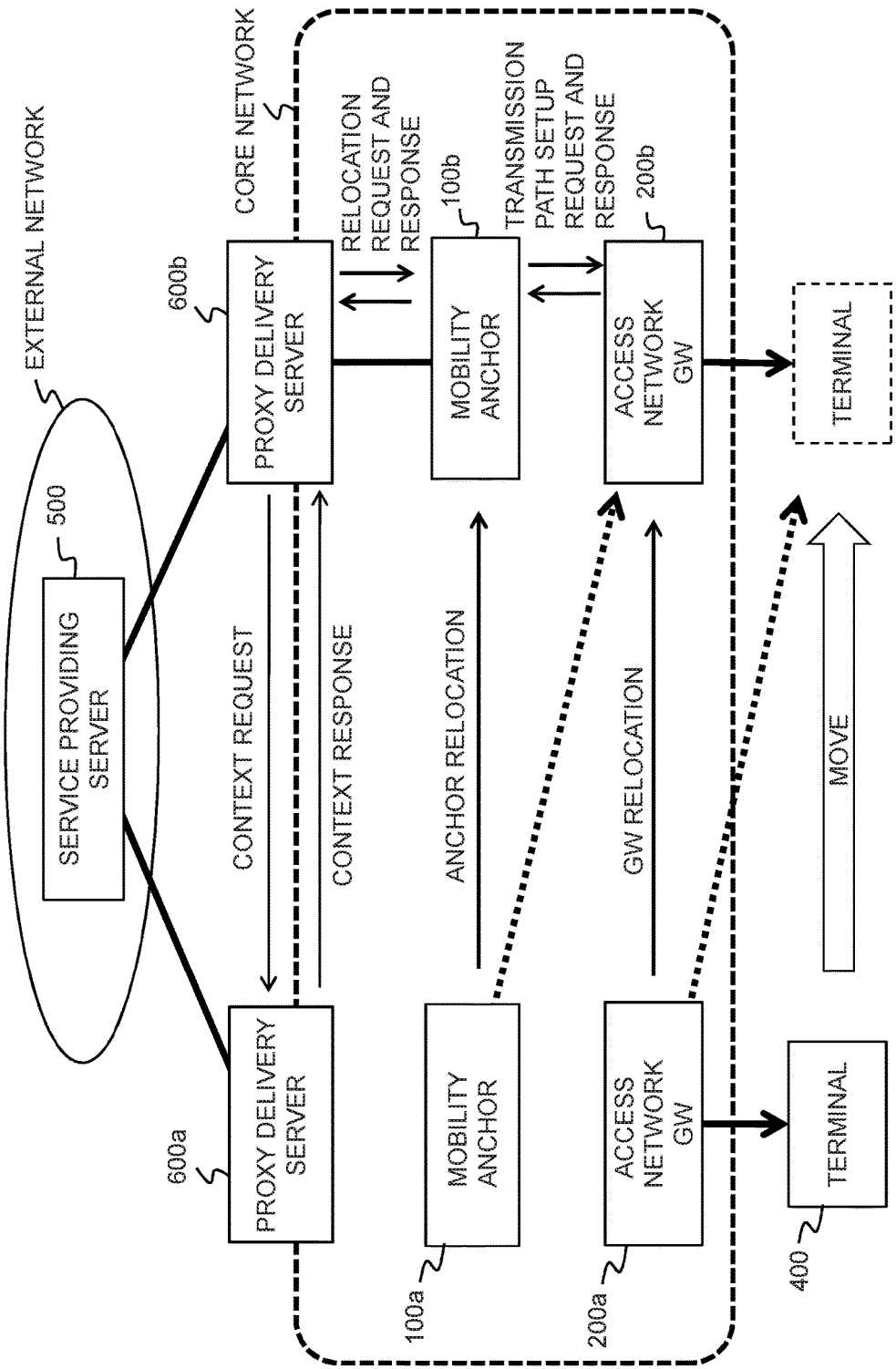
FIG. 1 is a schematic system architecture diagram for describing a mobile communication system as a background art.
Figure 2:
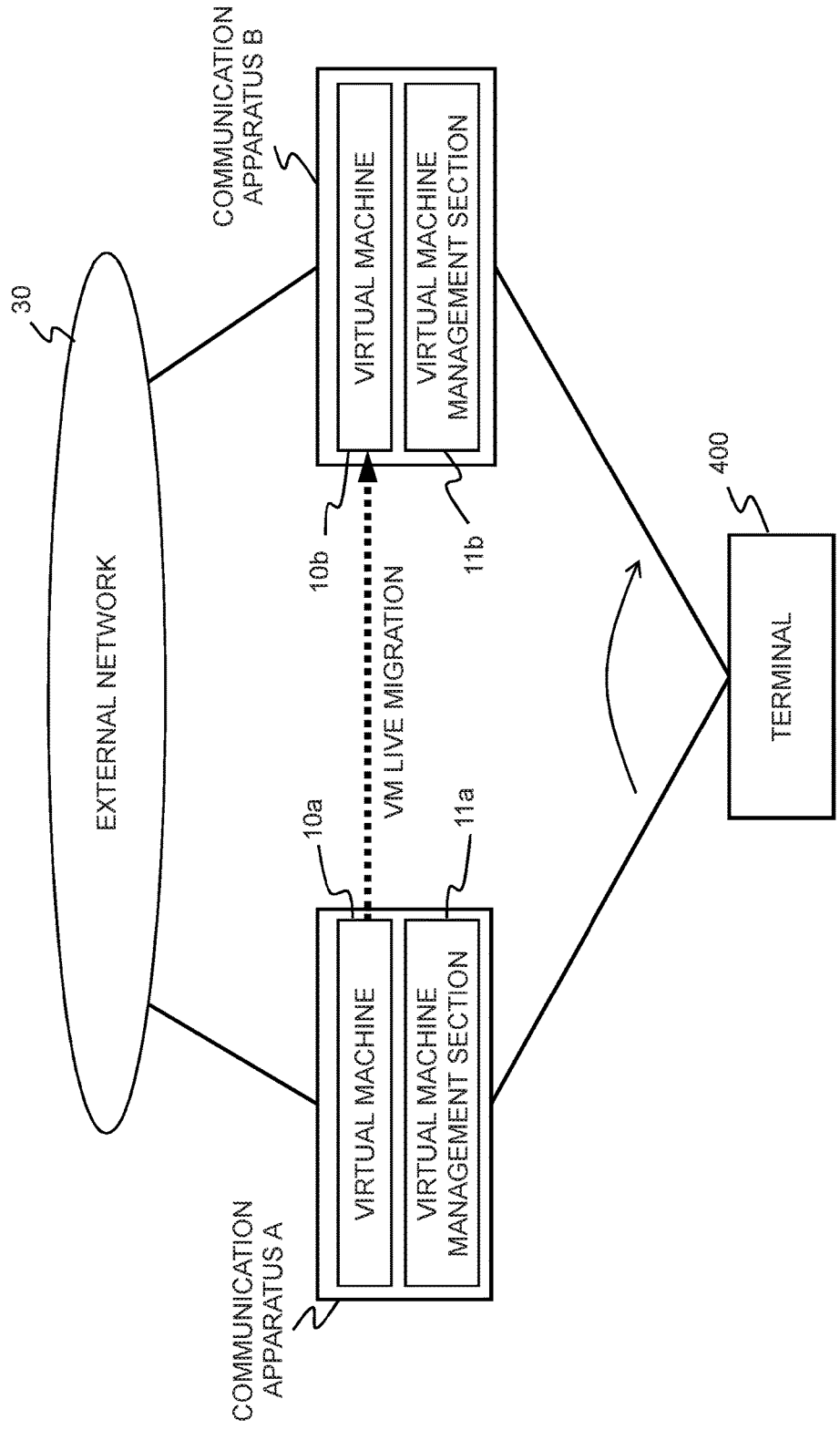
FIG. 2 is a system architecture diagram showing the overall architecture of a communication system for describing an outline of an exemplary embodiment of the present invention.

Referring to FIG. 2, according to an exemplary embodiment of the present invention, virtual machines (VMs: Virtual Machines) 10a and 10b that manage the state of communication with a terminal 400 can operate on communication apparatuses A and B, respectively, and virtual machine management sections 11a and 11b perform virtual machine migration, whereby it is possible to relocate management of the state of communication with the terminal from the communication apparatus A to the communication apparatus B. Thus, the communication apparatus B which is a destination of relocation can reproduce the state of a session with the terminal 400 by using session information prior to the migration. Accordingly, operations for extracting required information from the OS and generating and forwarding context information as mentioned above become unnecessary, and it is possible to easily relocate the communication apparatus while maintaining the continuity of a service provided by the communication apparatus itself or of a service provided from an external network 30.

Hereinafter, a mobile communication system including a mobility anchor that provides mobility to a terminal will be taken as an example. It is assumed that a service providing server in the external network 30 provides a service, and that the communication apparatuses A and B function as proxy delivery servers 600. Moreover, it is assumed that the communication apparatuses A and B can provide a service of relaying and forwarding a service provided by the service providing server in the external network 30 to the terminal 400, or a service of terminating such a service once and then sending the service to the terminal 400, and/or that the communication apparatuses themselves can provide a communication service (e.g., an address translation service such as NAT (Network Address Translation)) to the terminal 400. However, the present invention is not limited to these cases.

1. First Exemplary Embodiment 1.1) System Architecture

Figure 3:
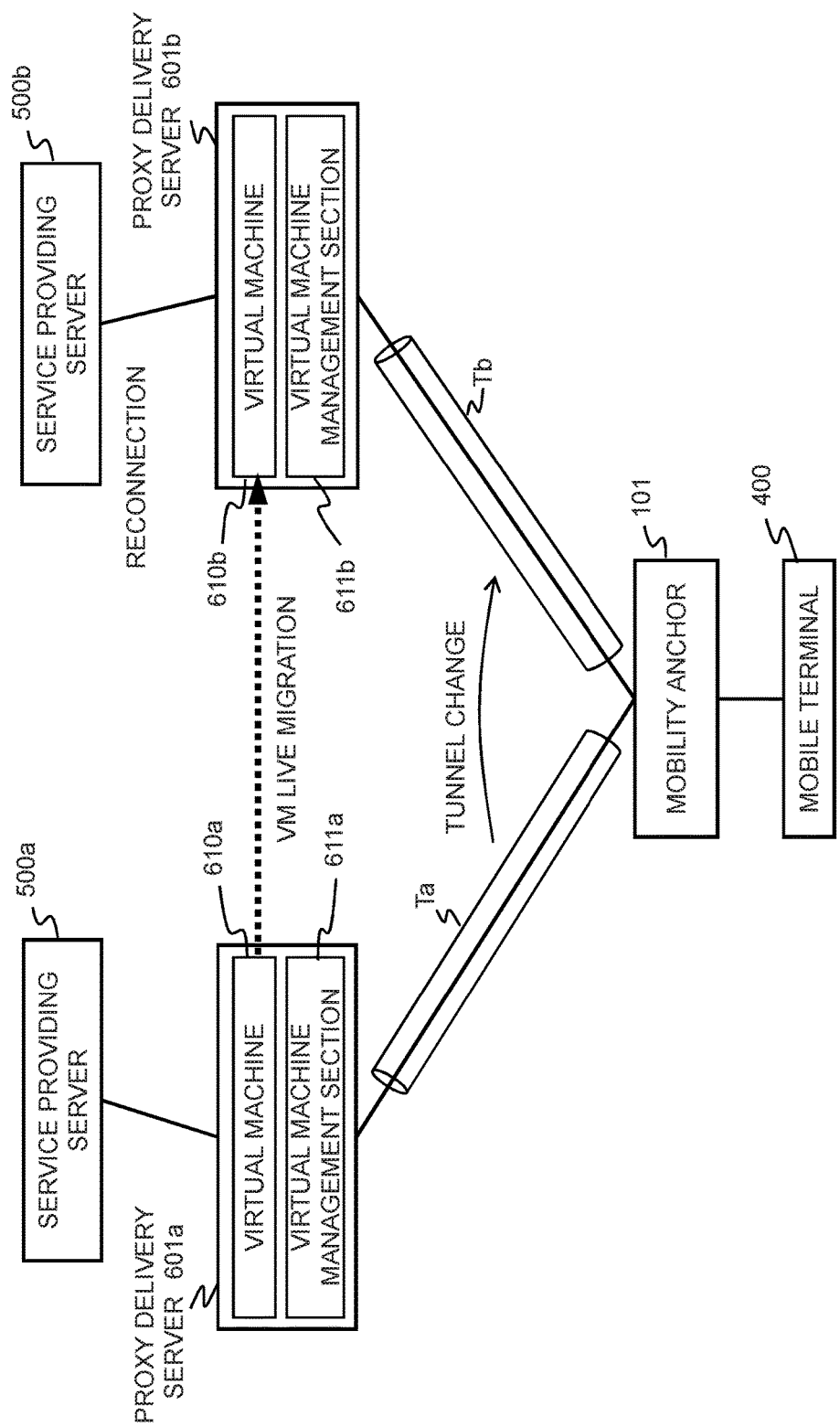
FIG. 3 is a system architecture diagram showing the overall architecture of a mobile communication system according to a first exemplary embodiment of the present invention.

Referring to FIG. 3, a plurality of proxy delivery servers 601a and 601b are deployed at a boundary between an external network and a core network, and here it is assumed that the proxy delivery servers 601a and 601b connect to service providing servers 500a and 500b in the external network, respectively. A mobility anchor 101, which provides mobility to a mobile terminal 400, can establish a tunnel Ta with the proxy delivery server 601a and a tunnel Tb with the proxy delivery server 601b, respectively. The mobility anchor 101 changes a connection with a proxy delivery server from the tunnel Ta to the tunnel Tb, along with virtual machine migration from the proxy delivery server 601a to the proxy delivery server 601b, which will be described later.

The proxy delivery servers 601a and 601b are physical machines that cause virtual machines 610a and 610b to operate thereon, respectively, and the virtual machines 610a and 610b each provide the actual functionality of a virtual delivery server. Virtual machine management sections 611a and 611b control the virtual machines 610a and 610b, respectively, and perform virtual machine live migration.

For a notation hereafter, it will be assumed that, for example, an arbitrary proxy delivery server is indicated if only a reference number is affixed to it, like "proxy delivery server 601", and a source proxy delivery server or a target proxy delivery server is indicated if a reference number accompanied by the letter "a" or "b" is affixed to it, like "proxy delivery server 601a" or "proxy delivery server 601b", respectively. The same will apply to other functions and apparatuses (mobility anchors, gateways, servers, and the like).

Figure 4:
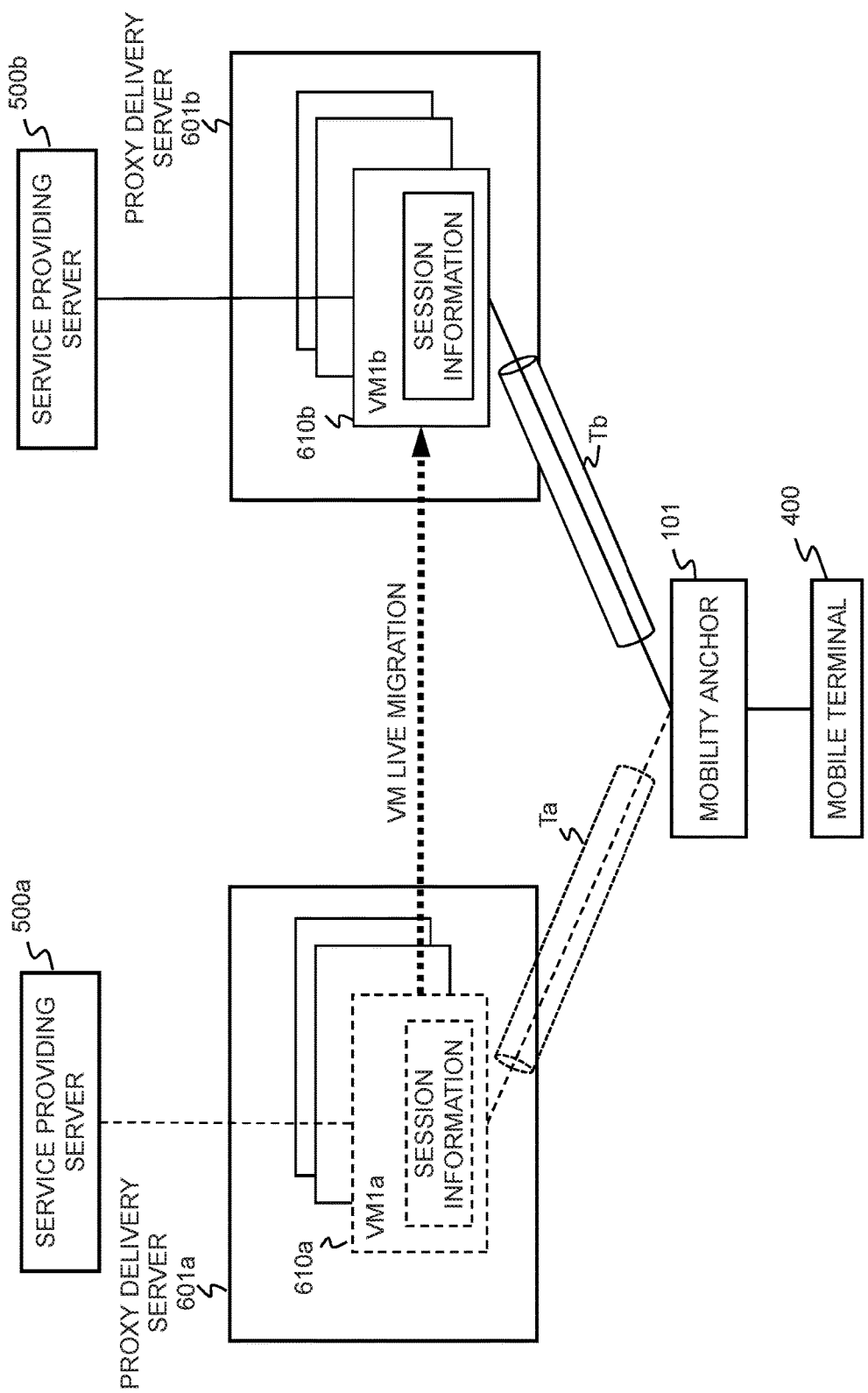
FIG. 4 is a schematic diagram for describing virtual machine migration in the first exemplary embodiment.

Referring to FIG. 4, the proxy delivery server 601 causes a virtual machine VM to operate for each mobile terminal and provides a proxy delivery server function. When VM live migration is performed, session information of a virtual machine VM1a and context information about data to be delivered are transferred from the proxy delivery server 601a to the proxy delivery server 601b. A virtual machine VM1b on the proxy delivery server 601b, when connecting to the service providing server 500b and connecting to the mobility anchor 101 through the tunnel Tb, continues the proxy delivery server function for a service to the mobile terminal 400 by using the transferred session information and context information.

1.2) Operation

Hereinafter, an example of communication control operation in the mobile communication system according to the present exemplary embodiment will be described with reference to FIG. 5. Note that FIG. 5 shows a case as an example where the service providing server 500 provides a download-type video distribution service based on HTTP.

Figure 5:
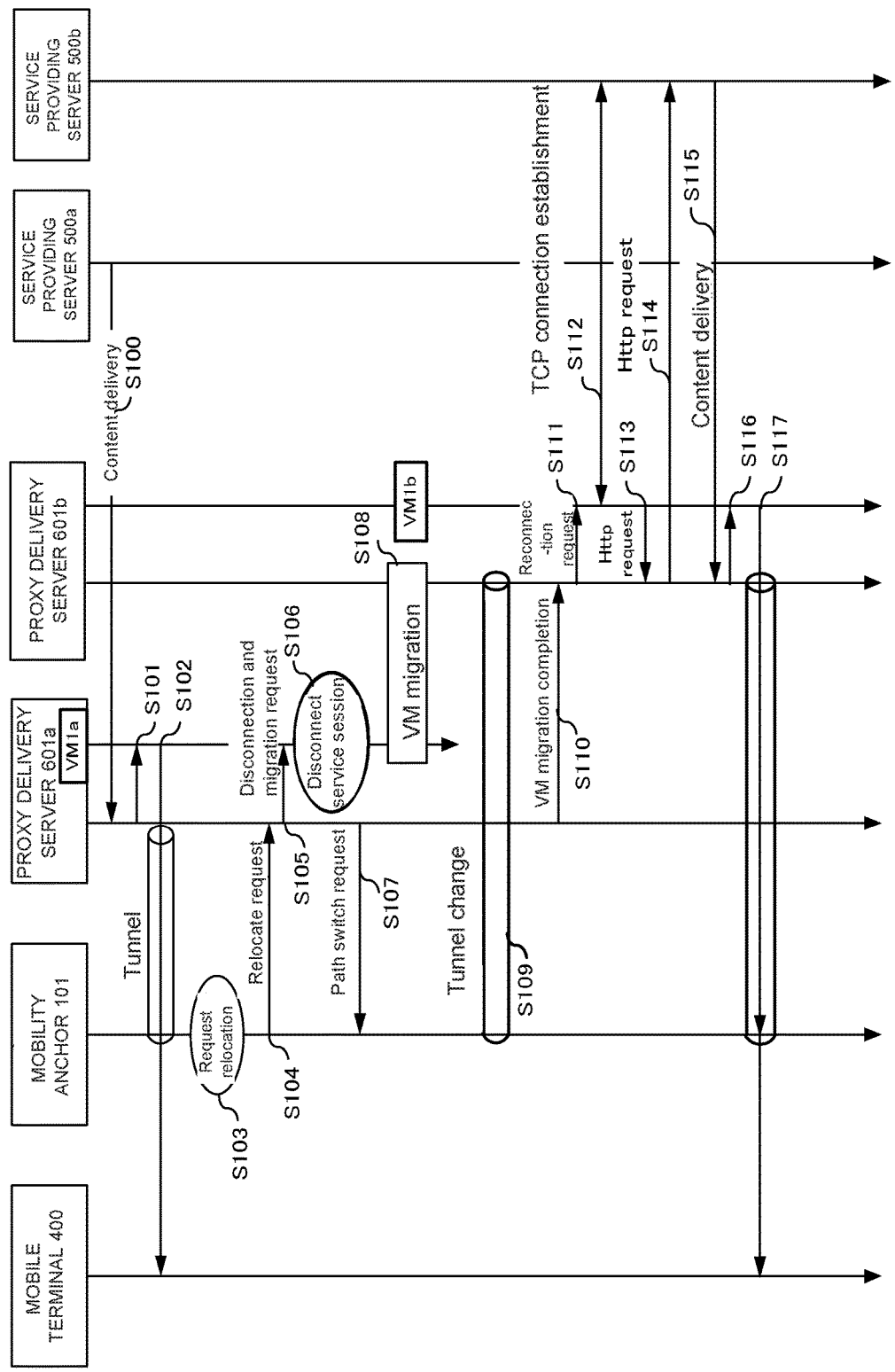
FIG. 5 is a sequence diagram showing an example of communication control in the mobile communication system according to the first exemplary embodiment.

Referring to FIG. 5, first, it is assumed that the mobile terminal 400 is receiving a content distributed by the service providing server 500a via the proxy delivery server 601a, tunnel Ta, and mobility anchor 101 (Operations S100 to S102). In the proxy delivery server 601a, the proxy delivery server function is implemented on the virtual machine VM1a, as described above. More specifically, the content from the service providing server 500a is first received by the proxy delivery server 601a and thereafter sent to the proxy delivery server operating on the virtual machine VM1a by using NAT or the like (Operation 101). Thereafter, the proxy delivery server function on the virtual machine VM1a delivers the content to the mobility anchor 101 via the tunnel Ta, and the mobile terminal 400 receives the content from the mobility anchor 101 (Operation S102).

In this case, the proxy delivery server 601a operates like a WEB proxy server, and a session of the mobile terminal 400 (a session based on TCP, UDP, or the like) is terminated by the proxy delivery server 601a. That is, the destination address of a packet sent by the mobile terminal 400 becomes an address internally retained by the proxy delivery server 601a, and the destination address of a packet sent by the service providing server 500a for content delivery also becomes an address retained by the proxy delivery server 601a.

Subsequently, it is assumed that the mobility anchor 101 receives a relocate request (Operation S103). In response to the relocate request, the mobility anchor 101 performs relocation processing for itself as necessary and thereafter sends a relocate request signal to the proxy delivery server 601a (Operation S104).

The proxy delivery server 601a having received the relocate request signal sends a signal for requesting disconnection of the session with the service providing server 500a and VM migration to the virtual machine VM1a, which is taking the proxy delivery server function (Operation S105).

The virtual machine VM1a having received the signal for requesting session disconnection and VM migration disconnects the session for content delivery established with the service providing server 500a (Operation S106), makes a path switch request to the mobility anchor 101 in order to establish a new communication path with the migration-target proxy delivery server 601b (Operation S107), and performs live migration for moving the proxy delivery server function from the proxy delivery server 601a to the proxy delivery server 601b (Operation S108). Here, the target of the virtual machine live migration is determined based on the location of the mobile terminal 400 after it has moved, as in the relocation of the mobility anchor 101 previously performed. For example, it is possible to use a DNS server or the like that responds with the IP address of a server close to the physical location of the mobile terminal 400, but a method is not necessarily limited to this.

The mobility anchor 101, in response to the path switch request (Operation S107), changes tunnels from the one to the proxy delivery server 601a to the one to the proxy delivery server 601b (Operation S109). The proxy delivery server 601a, when the VM migration has completed, notifies VM migration completion to the proxy delivery server 601b (Operation S110).

Triggered by the notification of migration completion, the proxy delivery server 601b makes a request for reconnection to the server providing server 500b, which is closer to the location of the mobile terminal 400 after it has moved, to the virtual machine VM1b having completed migration (Operation S111). When a session for content delivery is re-established between the virtual machine VM1b and the service providing server 500b (Operation S112), the virtual machine VM1b sends a Http request to the service providing server 500b via the proxy delivery server 601b in order to acquire the rest of the content from a location where delivery to the mobile terminal 400 was last stopped (Operations S113 and S114). Note that it is also possible to relocate the session between the virtual machine VM and the service providing server 500, without performing reconnection.

The service providing server 500b, in response to the Http request from the proxy delivery server 601b, makes Http 200OK and resumes delivery of the content (Operation S115). The proxy delivery server 601b forwards the distributed content to the virtual machine VM1b (Operation S116), and the virtual machine VM1b further sends the content to the mobile terminal 400 via the tunnel Tb and mobility anchor 101 (Operation S117).

1.3) Effects

As described above, according to the first exemplary embodiment of the present invention, the proxy delivery server is relocated by virtual machine migration, whereby it is possible to easily move information within a proxy delivery server about a session established with a mobile terminal to another proxy delivery server, and it is possible to switch service providing servers and mobility anchors while maintaining a service the mobile terminal is using, such as viewing of a content.

2. Second Exemplary Embodiment

In the above-described first exemplary embodiment, a case is illustrated where the single mobility anchor 101 exits as shown in FIG. 3. However, the present invention is also applicable in case where a plurality of mobility anchors exist. That is, processing for mobility anchor relocation may be involved prior to virtual machine migration. The processing for mobility anchor relocation can be performed in accordance with a standard method. Hereinafter, a second exemplary embodiment of the present invention will be described with referenced to FIG. 6. However, a description of the functions and configurations that overlap with those of the above-described first exemplary embodiment will be omitted, with the same reference numbers given thereto.

Figure 6:
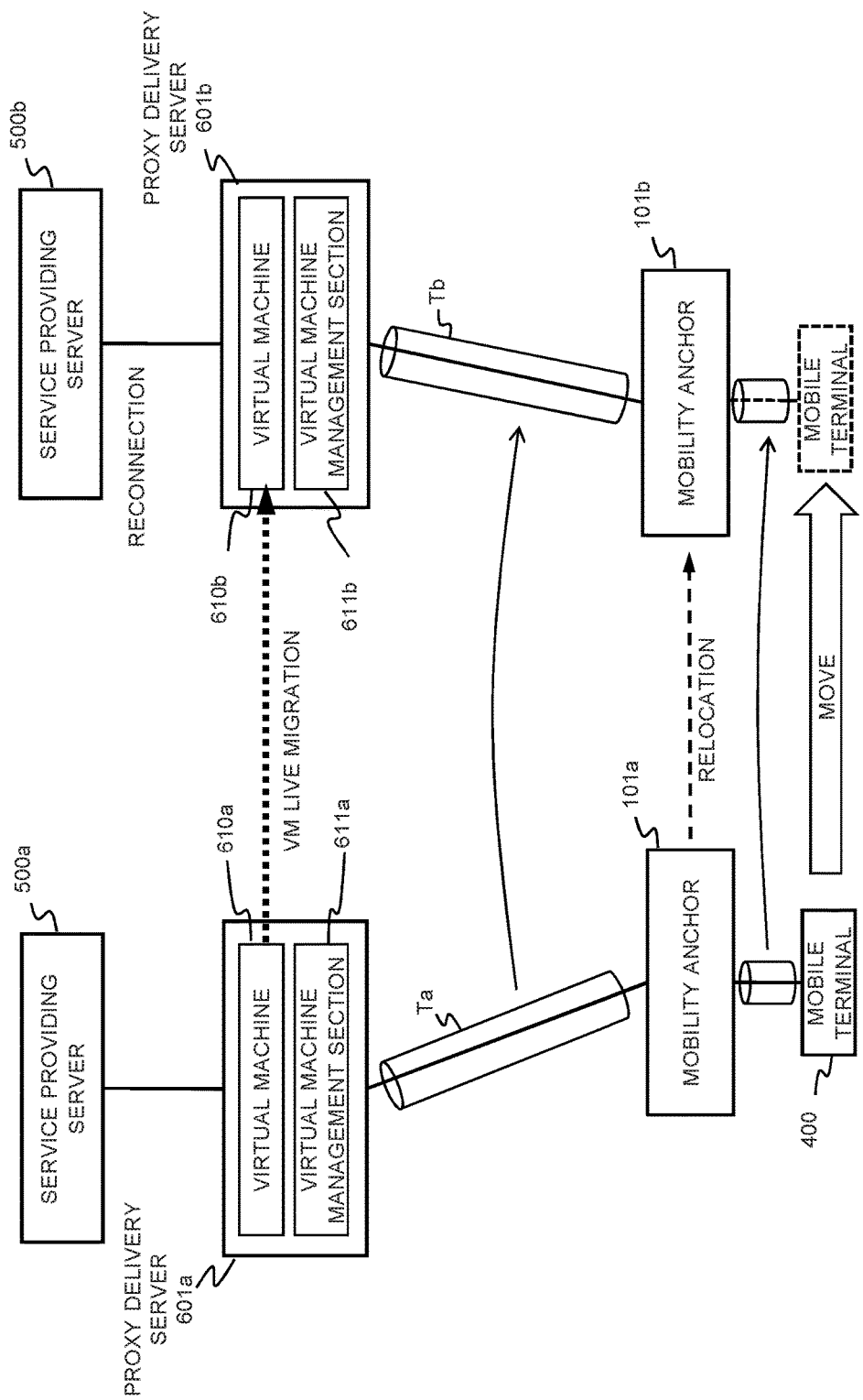
FIG. 6 is a system architecture diagram showing the overall architecture of a mobile communication system according to a second exemplary embodiment of the present invention.

Referring to FIG. 6, it is assumed that the mobility anchor that controls the mobility of the mobile terminal 400 is relocated from a mobility anchor 101a to a mobility anchor 101b, along with a move of the mobile terminal 400. In this case as well, the tunnel between the proxy delivery server 601 and the mobility anchor 101 is changed from the tunnel Ta to the tunnel Tb, and live migration of the virtual machine on the proxy delivery server 601 is performed as described above, whereby a content can be delivered to the mobile terminal 400 newly from the service providing server 500b via the proxy delivery server 601b, tunnel Tb, and mobility anchor 101b.

3. Third Exemplary Embodiment

In the above-described first and second exemplary embodiments, a case is illustrated where the proxy delivery servers 601a and 601b connect to the service providing servers 500a and 500b, respectively. However, it is also possible that content delivery is continued from a single service providing server.

Figure 7:
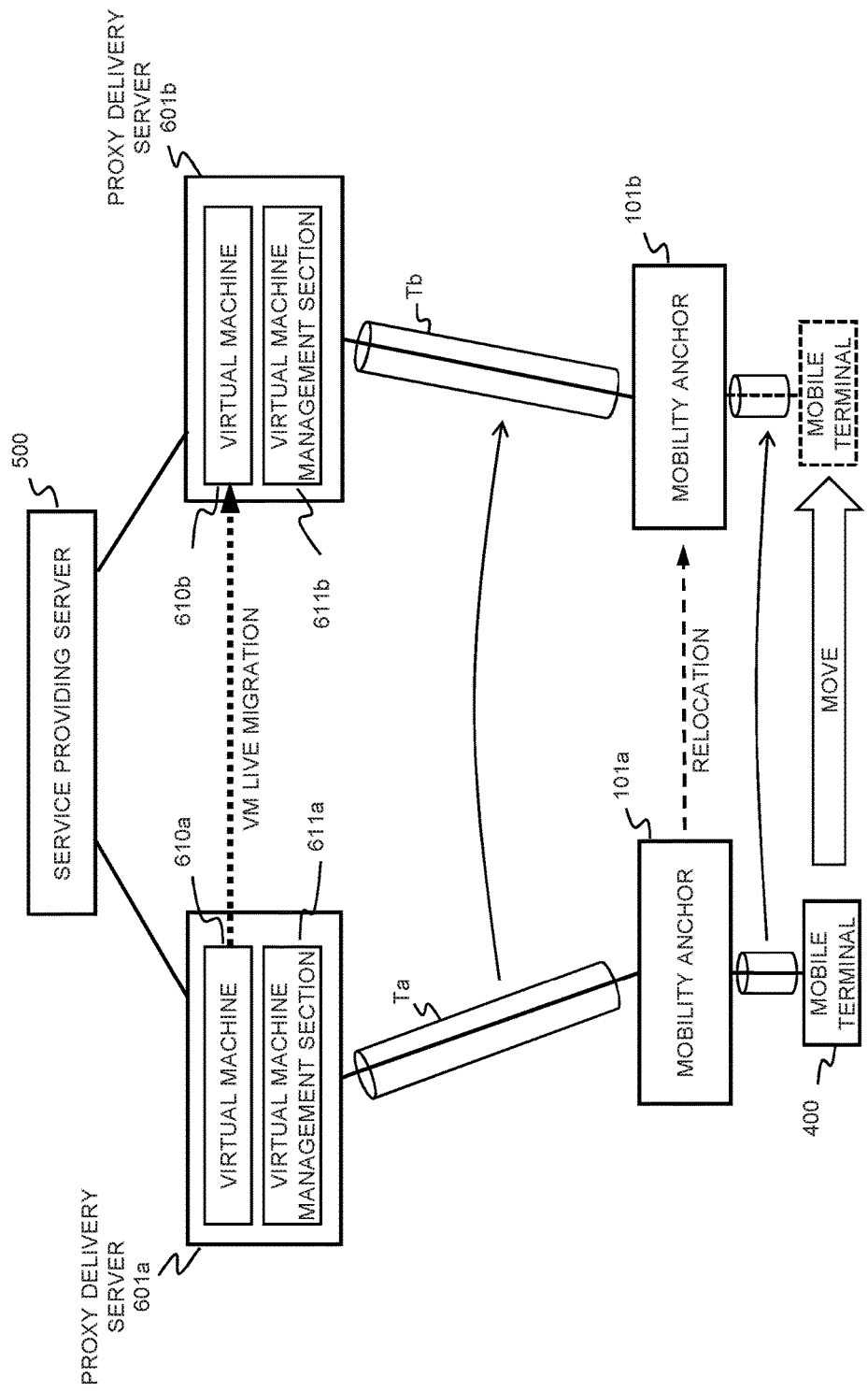
FIG. 7 is a system architecture diagram showing the overall architecture of a mobile communication system according to a third exemplary embodiment of the present invention.

Referring to FIG. 7, in a communication system according to a third exemplary embodiment of the present invention, both the proxy delivery servers 601a and 601b, which perform virtual machine live migration, may be connected to the service providing server 500, and when migration has completed, the subsequent part of a content may be delivered from the service providing server 500 to the mobility anchor 101b via the virtual machine 610b. In this case as well, the operations of the proxy delivery servers 601a and 601b are similar to those of the second exemplary embodiment.

4. Example

Hereinafter, an example of the present invention will be described in detail with reference to FIGS. 8 to 14. An architecture in the present example is based on the above-described second exemplary embodiment.

4.1) Overall Architecture

Figure 8:
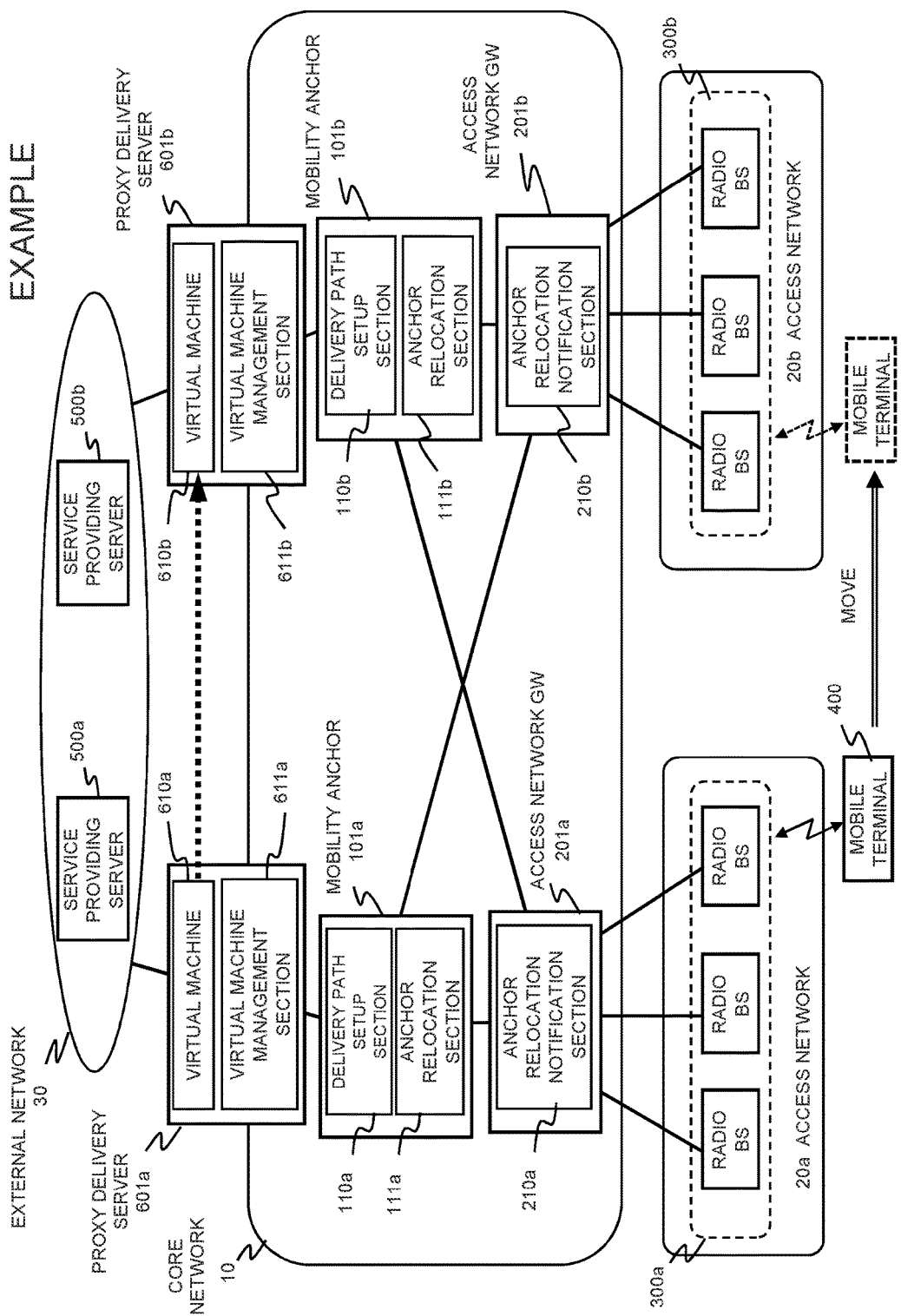
FIG. 8 is a system architecture diagram showing the overall architecture of a mobile communication system according to an example of the present invention.

Referring to FIG. 8, a mobile communication system according to the present example includes a core network 10, access networks 20, radio base stations 300, and a mobile terminal 400, and further the core network 10 includes mobility anchors 101 and access network GWs 201. Furthermore, proxy delivery servers 601 are provided between an external network 30 and the mobility anchors 101. It is assumed that service providing servers 500 that provide a service to the mobile terminal 400 are deployed in the external network 30.

The core network 10 is a network managed by an operator that mainly provides mobile communication services. It is a network corresponding to EPC (Evolved Packet Core) in 3GPP, or CNS (Connectivity Service Network) in WiMAX.

The access network 20 is a network accommodating the mobile terminal 400. The access network 20 makes a connection with the mobile terminal 400 and transfers traffic of the mobile terminal 400 through various radio access technologies employed in respective systems, such as WCDMA (Wideband Code Division Multiple Access) and LTE (Long Term Evolution) in 3GPP, IEEE802.16e in WiMAX, and WLAN (Wireless Local Area Network; IEEE802.11a/b/g/n).

The external network 30 is a network outside the mobile communication network, and, for example, the Internet corresponds to this network. Basically, it is a network managed by a manager different from the managers of the core network 10 and access networks 20.

The radio base station 300 sends and receives traffic to/from the mobile terminal 400 through various radio access technologies employed in respective mobile communication systems. In case of 3GPP, it transfers traffic of the mobile terminal 400 to/from the access network GW 201 through tunneling by GTP (General packet radio service Tunneling Protocol).

The mobile terminal 400 is a mobile station that performs mobile communication, such as a user equipment (UE: User Equipment), mobile terminal, smartphone, or note PC. When it supports MIPv6 and MIPv4 as mobility protocols, the mobile terminal 400 is equipped with functions for implementing mobile communication, such as location registration.

The service providing server 500 is a server that provides a service to the mobile terminal 400. For example, it corresponds to a WEB server, a video and music distribution server, or the like. Here, a server that distributes video contents will be assumed.

<Mobility Anchor>

The mobility anchor 101 is a node apparatus supporting any one of the already-mentioned GTP, MIPv6, PMIPv6, MIPv4, and PMIPv4 and corresponds to a node called HA (Home Agent) in case of MIPv6 and MIPv4, or a node called LMA (Local Mobility Anchor) in case of PMIPv6 and PMIPv4. Moreover, in 3GPP, it corresponds to a P-GW (Packet Data Network-Gateway) or a GGSN (Gateway GPRS Support Node). In any case, the most basic function of the mobility anchor 101 is a transferring function as follows. That is, the mobility anchor 101 forwards a packet that is sent toward an address remaining unchanged even if the mobile terminal 400 moves, to an address dependent on an access network at the location where the mobile terminal 400 is present, or the address of the access network GW 201, through tunneling in response to a transmission path setup request sent from the mobile terminal 400 or access network GW 201.

The address of the mobile terminal 400 or an address to be the transfer destination through tunneling can be acquired from the transmission path setup request signal. Registration (location registration) for implementing tunneling is performed by the mobile terminal 400 itself or the access network GW 201. For example, location registration is performed by the terminal itself in case where the protocol for implementing mobility is MIPv6 or MIPv4, or location registration is performed by the access network GW 201 in case of GTP, PMIPv6, or PMIPv4.

The mobility anchor 101 further includes a delivery path setup section 110 and an anchor relocation section 111. The delivery path setup section 110, when a transmission path setup request is received from the access network GW 201, sends to the proxy delivery server 601a relocate request signal or a tunnel request setup signal, which stores the address of the mobile terminal 400 included in the transmission path setup request signal and the address of the mobility anchor 101 itself. Here, when the transmission path setup request signal includes information indicating that this mobility anchor 101 is the target of anchor relocation, or when it can be determined, based on the type of the signal or by any other means in the system, that the transmission path setup request is one for allowing this mobility anchor 101 to be the target of anchor relocation, then the delivery path setup section 110 sends a relocate request signal to the proxy delivery server 601. In other cases, the delivery path setup section 110 sends a tunnel setup request signal to the proxy delivery server 601. The details of the proxy delivery server 601 will be described later.

When information meaning an anchor relocation request is stored in the transmission path setup request, or when it is determined based on a notification or the like in the system that anchor relocation is required, or the like, the anchor relocation section 111 stores information of a mobility anchor that is adequate for the relocation target in a transmission path setup response and sends it to the source of the transmission path setup request. Alternatively, it is also possible that the transmission path setup request is transferred to a mobility anchor that is adequate for the relocation target, and then a transmission path setup response returned as a result is transferred to the access network GW 201.

In selection of an adequate mobility anchor, it is conceivable to use information indicating the location of the access network GW 201 or the mobile terminal 400, which is acquired from the transmission path setup request signal or the like, and a database (a DNS server or the like) deployed within the mobility anchor or on the system, but methods are not limited to these. After the transmission path setup response including the information of a mobility anchor to be the relocation target is sent to the source of the transmission path setup request, information for transferring traffic to the mobile terminal 400 may be discarded immediately or may be discarded naturally upon expiration after a lapse of time.

The transmission path setup request and the transmission path setup response correspond to various signals, depending on the mobility protocol and the mobile communication system. Here, correspondence examples will be shown in the order "the name of a transmission path setup request—the name of a transmission path setup response—the source node of the transmission path setup request".

PMIPv6: Proxy Binding Update—Proxy Binding Acknowledge—access network GW (MAG: Mobile Access Gateway)

MIPv6: Binding Update—Binding Acknowledge—mobile terminal

PMIPv4: Proxy Registration Request—Proxy Registration Reply—access network GW (PMA: Proxy Mobile Agent)

MIPv4: Registration Request—Registration Reply—mobile terminal

GTP (names in the mobile communication system EPS defined in 3GPP):

Create Session Request—Create Session Response—access network GW (S-GW: Serving Gateway), or
  Modify Bearer Request—Modify Bearer Response—access network GW (S-GW), or
  Create PDP Context Request—Create PDP Context Response—access network GW (SGSN: Serving GPRS Support Node), or
  Update PDP Context Request—Update PDP Context Response—access network GW (SGSN)

<Access Network GW>

The access network GW 201 is a gateway accommodating the access network 20. In case where GTP, PMIPv6, and PMIPv4 are applied as mobility protocols, it supports any one of the mobility protocols and sends to the mobility anchor 101 location registration for transferring traffic to the destination of a move of the mobile terminal 400. In PMIPv6 and MPIPv4, it corresponds to a node called MAG or PMA. Moreover, in 3GPP, it corresponds to an S-GW or SGSN, and in WiMAX, it corresponds to an ASN-GW (Access Service Network-Gateway).

The access network GW 201, in addition to its general functions, further includes an anchor relocation notification section 210. When having received a transmission path setup response storing information about the mobility anchor 101 to be the target of anchor relocation in response to a transmission path setup request to the mobility anchor 101, the anchor relocation notification section 210 sends to this mobility anchor 101 a transmission path setup request storing information indicating that this mobility anchor 101 is the target of anchor relocation.

Moreover, when it is determined that relocation from another node or the like on the system needs to be notified to the relocation-source mobility anchor, the anchor relocation notification section 210 sends a transmission path setup request including information indicating anchor relocation to the mobility anchor 101. At this time, the access transmission path setup request may be configured to store information indicating the location of the access network GW 201, information indicating the location of the mobile terminal 400, and the like so that the mobility anchor 101 can select a more adequate mobility anchor 101 to be the relocation target.

Supposing a 3GPP mobile communication system, the access network GW 201 is also equipped with a function of transferring traffic to the destination of a move of the mobile terminal 400 through tunneling, similarly to the mobility anchor 101. In such events, GTP is applied for a protocol used for tunneling. Note that in case of 3GPP, an MME, a node that controls tunneling at a move of the mobile terminal 400, is present.

<Proxy Delivery Server>

The proxy delivery server 601 according to the present example has a function of concealing relocation from the mobile terminal 400 and ensuring the continuity of a service even when the mobility anchor 101 is relocated. The configuration and functions of the proxy delivery server 601 will be described in detail with reference to FIGS. 10 and 12.

4.2) Overall Operations

Figure 9:
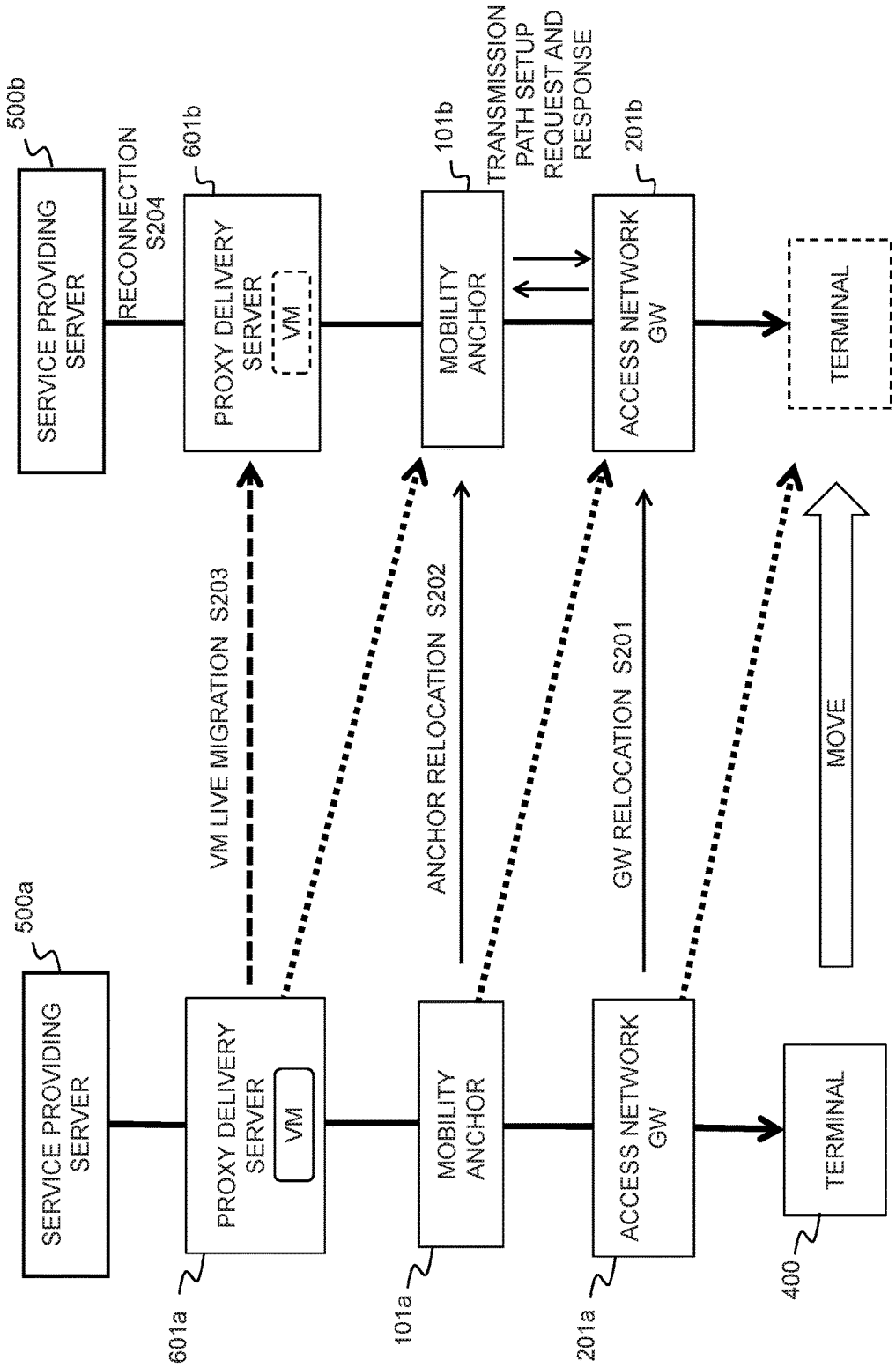
FIG. 9 is a schematic diagram for describing operations in the mobile communication system shown in FIG. 8.

Referring to FIG. 9, in operations in the communication system according to the present example, in addition to the already-described access network GW relocation (Operation S201) and mobility anchor relocation (Operation S202) accompanying a move of the mobile terminal 400, the proxy delivery server function is migrated through live migration of the virtual machine on the proxy delivery server (Operation S203). A virtual machine VM taking the proxy delivery server function is migrated directly to the target proxy delivery server 601b, whereby it is possible to easily migrate information about a session established with a mobile terminal within a proxy delivery server to another proxy delivery server.

4.3) Proxy Delivery Server

Figure 10:
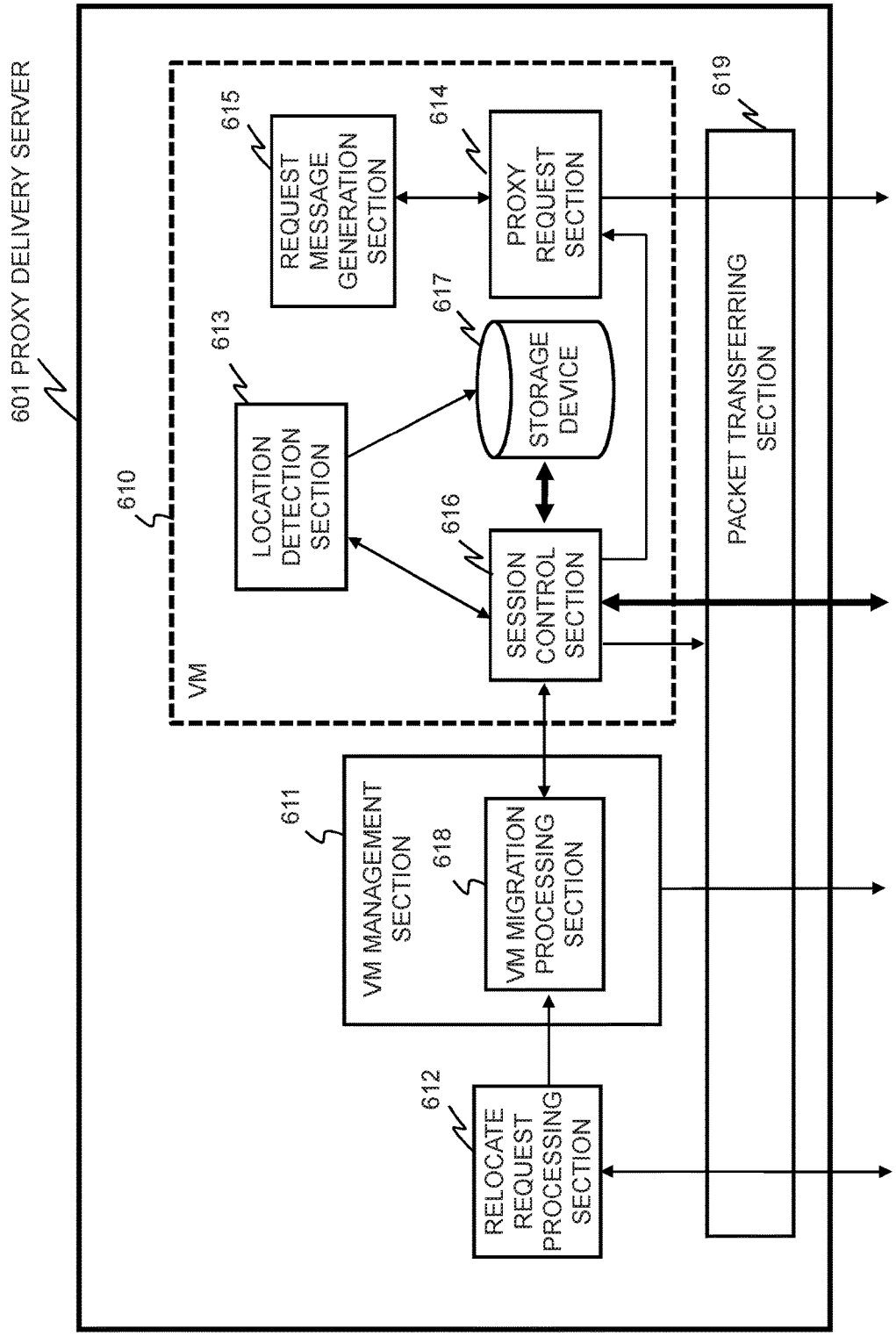
FIG. 10 is a block diagram showing an example of the functional configuration of a proxy delivery server in the mobile communication system shown in FIG. 8.

Referring to FIG. 10, the proxy delivery server 601 includes, for functions relevant to the present example, a virtual machine 610, a virtual machine management section 611, a relocate request processing section 612, and a packet transferring section 619. The virtual machine 610 functionally includes a location detection section 613, a proxy request section 614, a request message generation section 615, a session control section 616, and a storage device 617. The virtual machine management section 611 functionally includes a VM migration processing section 618.

The relocate request processing section 612, when receiving a relocate request signal sent from the mobility anchor 101 or the like, sends a processing request to the VM migration processing section 618. The VM migration processing section 618 disconnects a session with a server serving as the source of delivery of a content and records the number of bytes having been delivered to the terminal at the time of disconnection and the identifier of the proxy delivery server 601a, which is the relocation source. Thereafter, the relocate request processing section 612 of the relocation source communicates with the relocate request processing section 612 of the relocation target and then performs VM migration.

The relocate request processing section 612, at the same time as the VM migration, newly establishes a tunnel between the mobility anchor 101 and the packet transferring section 619 of the relocation target.

Upon completion of the VM migration, the VM migration processing section 618 of the relocation source notifies the VM migration processing section 618 of the relocation target that the VM migration has completed. The virtual machine 610 of the relocation target has a function of requesting the proxy request section 614 to send a content request signal to the service providing server 500, based on this VM migration completion notification.

The proxy request section 614 in the virtual machine 610 has a function of, in response to a request from the session control section 616, sending to the service providing server 500 a content request signal for acquiring a content provided in a relevant service from a designated location, or a location back from the designated location, by using context information such as a service name, a content identifier, and a content location input from the session control section 616. In such an event, the proxy request section 614 outputs the context information to the request message generation section 615 in order to configure the content request signal.

The request message generation section 615 in the virtual machine 610 retains, for each service, a message configuration method to acquire a specified content from a specified location. When context information is input from the proxy request section 614, the request message generation section 615 selects a message configuration method based on a service name included in the context information. The request message generation section 615, in accordance with this selected message configuration method, generates a content request message for acquiring a designated content provided in a designated service from a designated location and information about the destination thereof, from information included in the context information, such as a content identifier and a content location. The request message generation section 615 returns the generated content request message and information about the destination to the proxy request section 614 as a response to the context information from the proxy request section 614.

The session control section 616, when receiving a request signal of the mobile terminal 400 for viewing a content, extracts a service name and a content identifier from this request signal and determines, based on these information, whether or not a requested content (or the rest of a content from a start location if such a start location is further designated) is already recorded in the storage device 617.

When the content is already recorded in the storage device 617, the content is read from the storage device 617 and forwarded to the mobile terminal 400. Here, it is assumed that the content is retrieved by using a service name and a content identifier. However, a service name can be omitted when a single service is targeted, or when a content identifier that is uniquely identifiable across a plurality of services is used, or the like.

4.4) Operations of Target Proxy Delivery Server

Next, a description will be given of operations in case where the proxy delivery server according to the present example is the target proxy delivery server 601b, with reference to FIG. 11.

Figure 11:
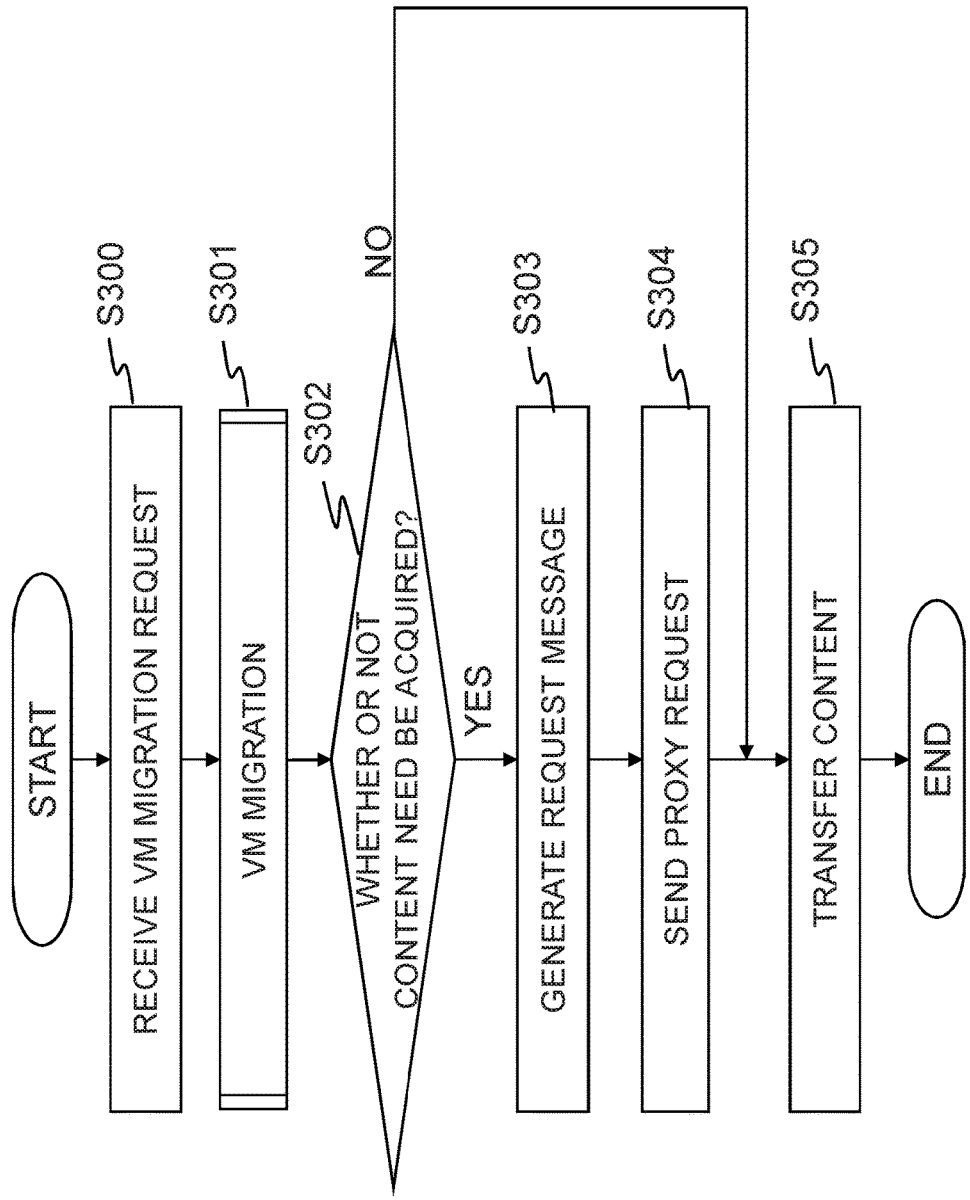
FIG. 11 is a flowchart showing communication control by a target proxy delivery server in the mobile communication system shown in FIG. 8.

Referring to FIG. 11, when a relocate request is received from the relocation-source motility anchor 101 or proxy delivery server 601a, or from the relocation-target mobility anchor 101b (Operation S300), the relocate request processing section 612 sends a VM migration request to the VM migration processing section 618.

The VM migration processing section 618, when receiving the VM migration request, performs VM migration to move the virtual machine VM1a that has been taking the proxy delivery server function at the relocation source to the own host (Operation S301). At this time, information on the content delivery to the mobile terminal 400 (the IP address of the mobile terminal, the number of bytes delivered, and the like), which has been performed by the relocation source, remains stored in the virtual machine VM1b operating on the own host. Accordingly, the virtual machine VM1b continuously uses the information also after VM migration and thereby can provide the mobile terminal 400 with the continuity of the service before and after relocation.

Subsequently, the session control section 616 determines whether or not the requested content is already stored in the storage device 617 (Operation S302). If it is not stored in the storage device 617 (YES at Operation S302), the proxy request section 614 and the request message generation section 615 generate a content request signal for acquiring the rest of the content subsequent to a required location, based on the information stored in the virtual machine VM1b (Operation S303), and sends the content request signal to the service providing server 500 from which the content is to be acquired (Operation S304).

Note that the content acquired from the service providing server 500 is not directly delivered to the mobile terminal 400, but may be recorded in the storage device 617 temporarily. That is, it is possible that the content is delivered to the mobile terminal 400 after buffering of some size in consideration of the bit rate of the content and the communication rate to mobile terminal 400 has completed. In this case, the session control section 616 can unify the sources from which the content is acquired into the storage device 617.

When the content is acquired from the service providing server 500 in Operation S304, or when the content is already stored in the storage device 617 (NO at Operation S302), the session control section 616 delivers to the mobile terminal 400 the rest of the content immediately subsequent to the location up to which the mobile terminal 400 received the content before relocation (Operation S305). In this event, the packet transferring section 619 encapsulates packets for content delivery and forwards them by tunneling.

4.5) Operations of Source Proxy Delivery Server

Next, a description will be given of operations in case where the proxy delivery server according to the present example is the source proxy delivery server 601a, with reference to FIG. 12.

Figure 12:
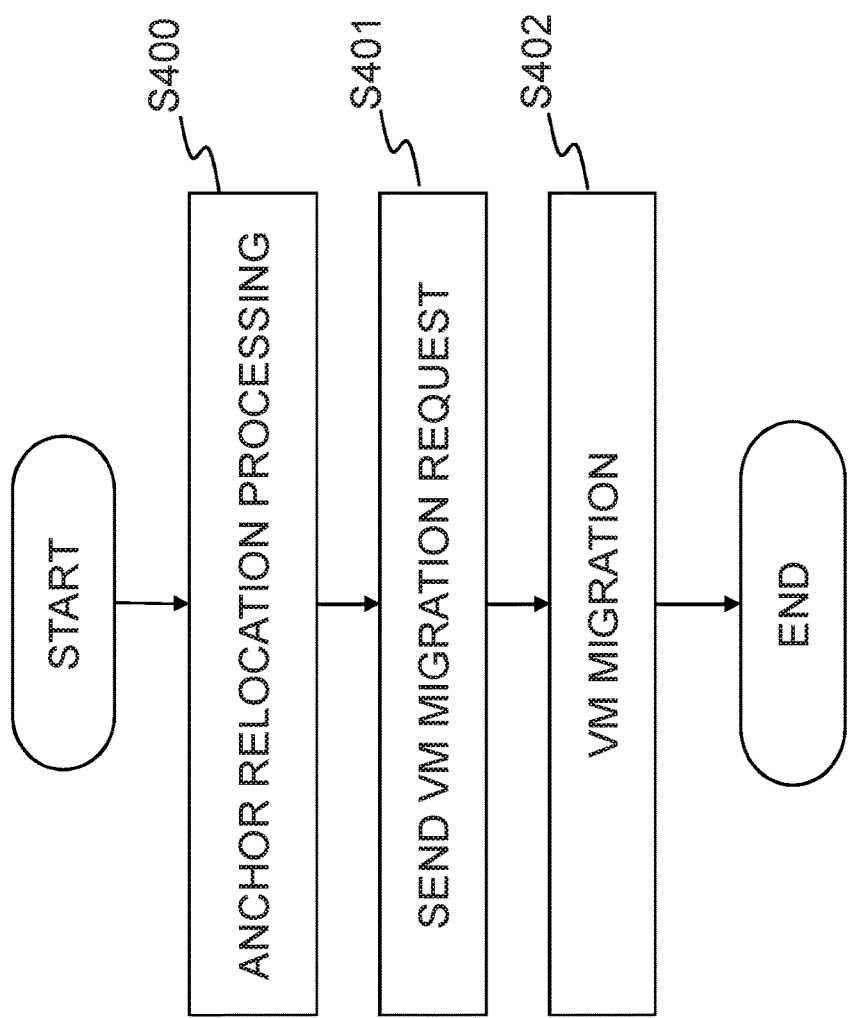
FIG. 12 is a flowchart showing communication control by a source proxy delivery server in the mobile communication system shown in FIG. 8.

Referring to FIG. 12, it is assumed that the relocate request processing section 612 of the proxy delivery server 601a receives a relocate request from the mobility anchor 101a (Operation S400). The relocate request at this time is not necessarily received from the mobility anchor 101a, but only need be a request from a node that manages the mobility of the mobile terminal 400 or can detect the mobility of the mobile terminal and determine the necessity/unnecessity of relocation.

Subsequently, the VM migration processing section 618 of the proxy delivery server 601*a* makes a VM migration request to the virtual machine 610, based on the received relocate request (Operation S401).

The VM migration processing section 618 of the proxy delivery server 601*a* performs VM migration in coordination with the VM migration processing section 618 of the proxy delivery server 601*b* (Operation S402).

4.6) System Communication Control

Next, a description will be given of communication control in the mobile communication system according to the present example, with reference to FIG. 13. However, the operations of the radio base station 300 are not directly relevant and therefore will be omitted. Here assumed is a situation in which the service providing server 500 provides a download-type video distribution service based on HTTP.

Figure 13:
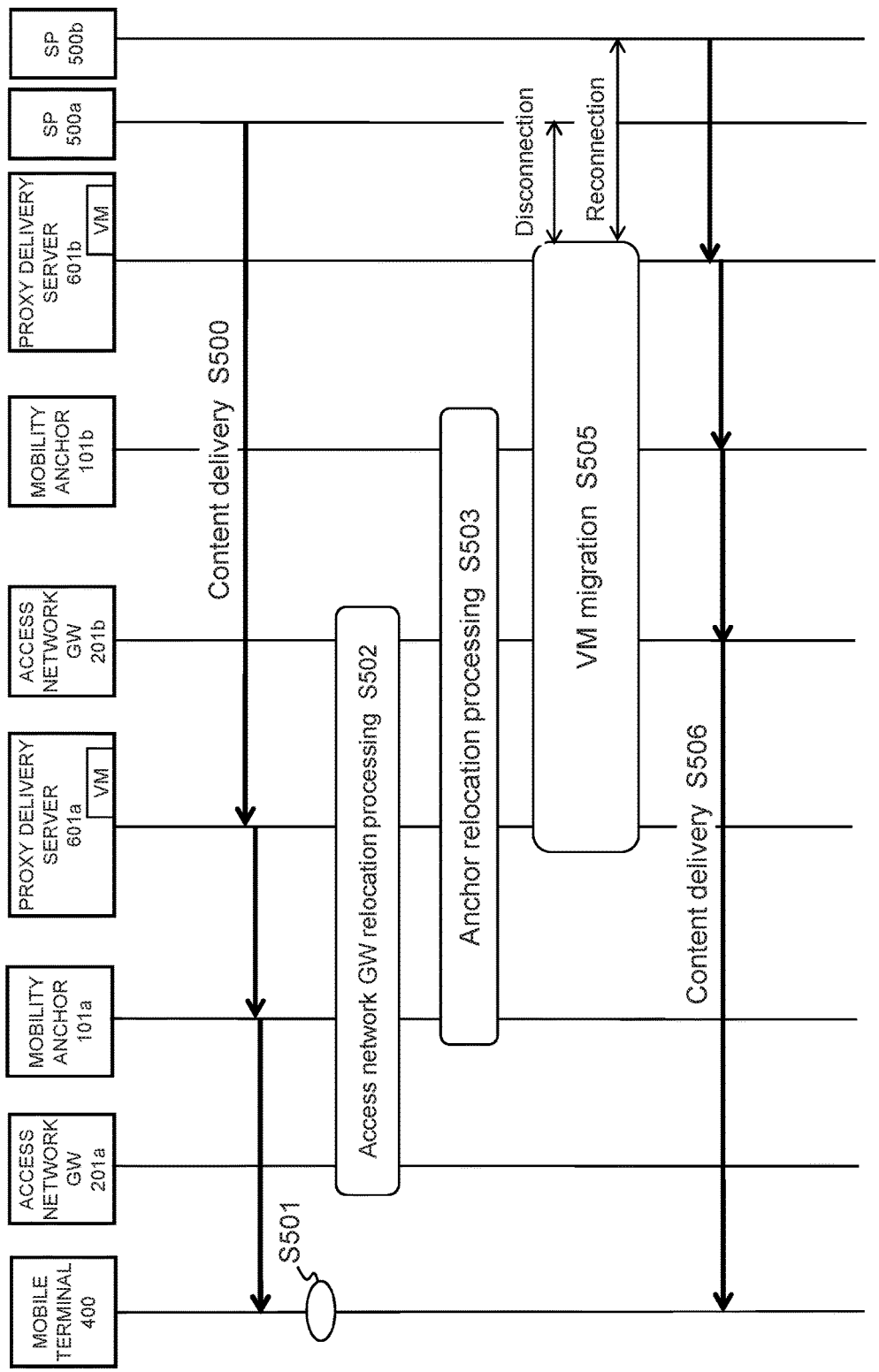
FIG. 13 is a sequence diagram showing an example of communication control in the mobile communication system shown in FIG. 10.

Referring to FIG. 13, it is assumed that the mobile terminal 400 is viewing a content distributed by the service providing server 500*a* (Operation S500). In this case, the content is delivered to the mobile terminal 400 via the proxy delivery server 601*a*, mobility anchor 101*a*, and access network GW 201*a*.

As a result of a move of the mobile terminal 400, the mobile communication system determines that relocation shall be performed, based on the presence/absence of the access network GW 201*b* and mobility anchor 101*b* that are more adequate than the current access network GW 201*a* and mobility anchor 101*a*, and other conditions (Operation S501). For example, in 3GPP, a MME (Mobility Management Entity) checks location information, which can be acquired from a TAU (Tracking Area Update) sent from the mobile terminal 400, and determines whether or not relocation to a closer anchor should be performed. However, in other mobile communication systems, other methods are used to determine whether or not relocation should be performed. The determination on relocation is not directly relevant to the present invention, and therefore the details thereof will be omitted.

When it is determined that relocation shall be performed, processing for relocation from the access network GW 201*a* to the access network GW 201*b* (Operation S502) and processing for relocation from the mobility anchor 101*a* to the mobility anchor 101*b* (Operation S503) are performed as described already. However, a case is also conceivable where the mobility anchor 101 is relocated without the access network GW being relocated.

Subsequently, the source proxy delivery server 601*a* disconnects a session with the service providing server 500*a*, changes from the tunnel to the source proxy delivery server 601*a* to the other tunnel to the target proxy delivery server 601*b*, and performs virtual machine migration with the target proxy delivery server 601*b* (Operation S505). In this event, the target proxy delivery server 601*b* re-establishes a session for content delivery with the service providing server 500*b*.

When a connection is thus re-established between the proxy delivery server 601*b* and the service providing server 500*b*, the rest of the content subsequent to a point where the delivery to the mobile terminal 400 was last finished is delivered from the service providing server 500*b* via the proxy delivery server 601*b*, mobility anchor 101*b*, and access network GW 201*b* (Operation S506).

Note that although the service providing servers 500*a* and 500*b* are described as discrete servers in the present example, the present example is not limited to this. It is also possible that a single service providing server is provided, as shown in FIG. 7.

5. Other Examples

Figure 14:
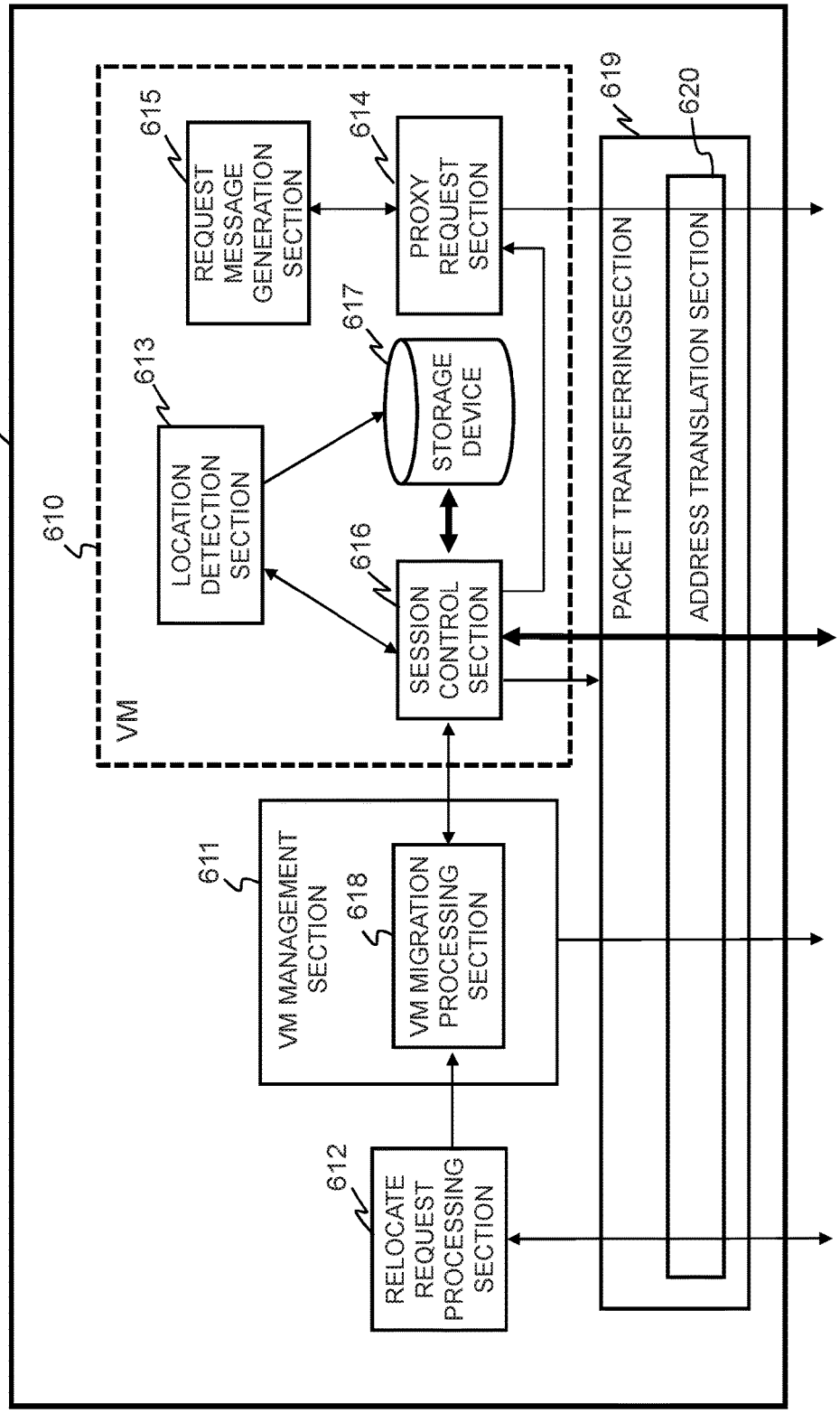
FIG. 14 is a block diagram showing another example of the functional configuration of the proxy delivery server in the mobile communication system shown in FIG. 10.

Referring to FIG. 14, a proxy delivery server 602 according to another example of the present invention includes a packet transferring section 619 and an address translation section 620, in addition to the configuration of the proxy delivery server 601 shown in FIG. 10. The address translation section 620 conceals the source address of a packet arriving from a mobile terminal by using a common address, whereby even if the mobile terminal moves and addresses are changed, it is possible to conceal the address change from a service providing server.

Moreover, the proxy delivery server 602 may be equipped with a function of counting a communication amount for each address of a mobile terminal so that the service providing server 500 can charge even if a change of the address of a mobile terminal is concealed.

6. Others

The proxy delivery servers according to the above-described exemplary embodiments and examples can be implemented by using software, a computer (a program-controlled processor such as a CPU) for the software to operate thereon, and a storage device.

The present invention is applicable to various mobile communication systems to which various mobility protocols are applied. The following show mappings between prescribed nodes in the mobile communication systems according to 3GPP EPS, 3GPP GPRS/UMTS, and WiMAX Forum, which are main conceivable target mobile communication systems to which the present invention can be provided, and the nodes described in the individual exemplary embodiments.

3GPP EPS
Mobility anchor: Packet Data Network-Gateway (PDN-GW)
Access network GW: Serving-Gateway (S-GW)
Radio base station: enhanced NodeB (eNB)
3GPP GPRS/UMTS
Mobility anchor: Gateway GPRS Support Node (GGSN)
Access network GW: Serving GPRS Support Node (SGSN)
Radio base station: NodeB (NB)
WiMAX Forum
Mobility anchor: Home Agent (HA) or LMA (Local Mobility Anchor)
Access network GW: Access Service Network-Gateway (ASN-GW)
Radio base station: Base Station (BS)

INDUSTRIAL APPLICABILITY

The present invention is applicable to technologies for realizing the continuity of a service at the time of anchor relocation in future mobile communication systems.

REFERENCE SIGNS LIST

10 Core network
20 Access network

30 External network
101 Mobility anchor
110 Delivery path setup section
111 Anchor relocation section
201 Access network GW
210 Anchor relocation notification section
300 Radio base station
400 Mobile terminal
500 Service providing server
601, 602 Proxy delivery server
610 Virtual machine
611 Virtual machine management section
612 Relocate request processing section
613 Location detection section
614 Proxy request section
615 Request message generation section
616 Session control section
617 Storage device
618 VM migration processing section
619 Packet transferring section
620 Address translation section

The invention claimed is:

1. A communication apparatus deployed between a terminal and an external network, which includes at least one service providing server, wherein the communication apparatus functions as a proxy to provide a service from the at least one service providing server to the terminal through the communication apparatus, the communication apparatus comprising:
    a virtual machine that manages a state of communication with the terminal and terminates a session for providing the service between the virtual machine and the terminal, wherein the virtual machine includes session information on the session, wherein the session information includes the state of communication; and
    a controller configured to perform migration of the virtual machine including the session information, which includes the state of communication, either from another source communication apparatus to the communication apparatus or from the communication apparatus to another target communication apparatus.

2. The communication apparatus according to claim 1, wherein when the migration of the virtual machine is made from the source communication to the communication apparatus, the virtual machine continues providing the service to the terminal by using the session information that is moved from the source communication apparatus.

3. The communication apparatus according to claim 1, wherein the session information is information required to reproduce a state of the session.

4. The communication apparatus according to claim 1, wherein when the migration of the virtual machine is made from the source communication apparatus to the communication apparatus, the virtual machine continues providing the service to the terminal based on information on a service having been provided to the terminal from the source communication apparatus.

5. The communication apparatus according to claim 1, wherein the virtual machine functions as a proxy-providing server that provides the service from the at least one service providing server to the terminal.

6. The communication apparatus according to claim 5, further comprising an address translation unit for translating a source address of a packet from the terminal to the at least one service providing server into a common address to conceal the source address of the packet from the at least one service providing server.

7. A communication control method for a communication apparatus deployed between a terminal and an external network, which includes at least one service providing server, wherein the communication apparatus functions as a proxy to provide a service from the at least one service providing server to the terminal, the method comprising:
    by a virtual machine, managing a state of communication with the terminal and terminating a session for providing the service between the virtual machine and the terminal, wherein the virtual machine includes session information on the session, wherein the session information includes the state of communication; and
    by a controller, performing migration of the virtual machine including the session information, which includes the state of communication, either from another source communication apparatus to the communication apparatus or from the communication apparatus to another target communication apparatus.

8. The communication control method according to claim 7, wherein when the migration of the virtual machine is made from the source communication apparatus to the communication apparatus, the virtual machine continues providing the service to the terminal by using the session information that is moved from the source communication apparatus.

9. The communication control method according to claim 7, wherein the session information is information required to reproduce a state of the session.

10. The communication control method according to claim 7, wherein when the migration of the virtual machine is made from the source communication apparatus to the communication apparatus, the virtual machine continues providing the service to the terminal based on information on a service having been provided to the terminal from the source communication apparatus.

11. The communication control method according to claim 7, wherein the virtual machine functions as a proxy-providing server that provides the service from the at least service providing server to the terminal.

12. The communication control method according to claim 11, further comprising, by an address translation unit, translating a source address of a packet from the terminal to the at least one service providing server into a common address a to conceal the source address of the packet from the at least one service providing server.

13. A communication system including a terminal, comprising:
    at least one service providing server that provides a service;
    a plurality of communication apparatuses that are deployed between the terminal and an external network, which includes the at least one service providing server, wherein each of the plurality of communication apparatuses functions as a proxy to provide a service from the at least one service providing server to the terminal through the each of the plurality of communication apparatus, wherein the plurality of communication apparatuses include a first communication apparatus and a second communication apparatus,
    wherein the first communication apparatus includes:
        a virtual machine that manages a state of communication with the terminal and terminates a session for providing the service between the virtual machine and the terminal, wherein the virtual machine includes session information on the session, wherein the session information includes the state of communication; and a controller configured to perform migration of the virtual machine including the session information, which includes the state of communication, either from the second communication apparatus to the first communication apparatus or from the first communication apparatus to the second communication apparatus.

14. The communication system according to claim 13, wherein when the migration of the virtual machine is made from the second communication to the first communication apparatus, the virtual machine continues providing the service to the terminal by using the session information that is moved from the second communication apparatus.

15. The communication system according to claim 13, wherein the session information is information required to reproduce a state of the session.

16. The communication system according to claim 13, wherein when the migration of the virtual machine is made from the second communication to the first communication apparatus, the virtual machine continues providing the service to the terminal based on information on a service having been provided to the terminal from the second communication apparatus.

17. The communication system according to claim 13, wherein the virtual machine functions as a proxy-providing server that provides the service from the at least one service providing server to the terminal.

18. The communication system according to claim 17, further comprising an address translation unit for translating a source address of a packet from the terminal to the at least one service providing server into a common address to conceal the source address of the packet from the at least one service providing server.

19. A non-transitory medium storing a program which causes a computer to function as a communication apparatus according to claim 1.

* * * * *